(12) United States Patent
Lenzini et al.

(10) Patent No.: US 7,801,152 B2
(45) Date of Patent: Sep. 21, 2010

(54) METHOD AND SYSTEM FOR SCHEDULING UTILIZATION OF RESOURCES, RELATED COMMUNICATION NETWORK AND COMPUTER PROGRAM PRODUCT

(75) Inventors: Luciano Lenzini, Pisa (IT); Enzo Mingozzi, Pisa (IT); Massimo Sassi, Turin (IT); Enrico Scarrone, Turin (IT); Giovanni Stea, Pisa (IT); Vinicio Vercellone, Turin (IT)

(73) Assignee: Telecom Italia S.p.A., Milan (IT)

( * ) Notice: Subject to any disclaimer, the term of this patent is extended or adjusted under 35 U.S.C. 154(b) by 497 days.

(21) Appl. No.: 11/587,417

(22) PCT Filed: Apr. 26, 2004

(86) PCT No.: PCT/EP2004/004379

§ 371 (c)(1),
(2), (4) Date: Oct. 24, 2006

(87) PCT Pub. No.: WO2005/104452

PCT Pub. Date: Nov. 3, 2005

(65) Prior Publication Data

US 2008/0025301 A1    Jan. 31, 2008

(51) Int. Cl.
*H04L 12/56* (2006.01)
(52) U.S. Cl. .................................. 370/395.4
(58) Field of Classification Search ............ 370/395.21, 370/395.4, 395.41–395.43
See application file for complete search history.

(56) References Cited

U.S. PATENT DOCUMENTS 6,493,316 B1 * 12/2002 Chapman et al. ............ 370/231

(Continued)

FOREIGN PATENT DOCUMENTS

WO    WO-01/24428 A1    4/2001

(Continued)

OTHER PUBLICATIONS

L. Lenzini et al.; "A Unifying Service Discipline for Providing Rate-Based Guaranteed and Fair Queuing Services Based on the Timed Token Protocol", IEEE Transactions On Computers, vol. 51, No. 9, pp. 1011-1025, (2002).

(Continued)

*Primary Examiner*—Dang T Ton
*Assistant Examiner*—Kevin Lee
(74) *Attorney, Agent, or Firm*—Finnegan, Henderson, Farabow, Garrett & Dunner, L.L.P.

(57) ABSTRACT

A system for scheduling utilization of a service resource by a plurality of flows of information packets, wherein the flows include rate-guaranteed synchronous flows and best-effort asynchronous flows, the asynchronous flows exploiting the service capacity of the resource left unexploited by the synchronous flows. A server visits the flows, in subsequent rounds, by visiting first the synchronous flows followed by the asynchronous flows. The server is configured for detecting any backlogged synchronous flow, and when the server visits any said backlogged synchronous flow, it allows the backlogged synchronous flow to utilize the resource for a given time, whereby the synchronous flows have a guaranteed transmission window on each round. When the server visits any asynchronous flow, the time elapsed since the last visit by the server to the same asynchronous flow is determined. If the visit to the asynchronous flow occurs later than expected based on a reference round time, the asynchronous flow being visited is restrained from utilizing the resource for the ongoing round, and if the visit occurs earlier than expected based on the reference round time the asynchronous flow being visited is allowed to utilize the resource for a respective given time.

20 Claims, 6 Drawing Sheets

U.S. PATENT DOCUMENTS

Figure 1:
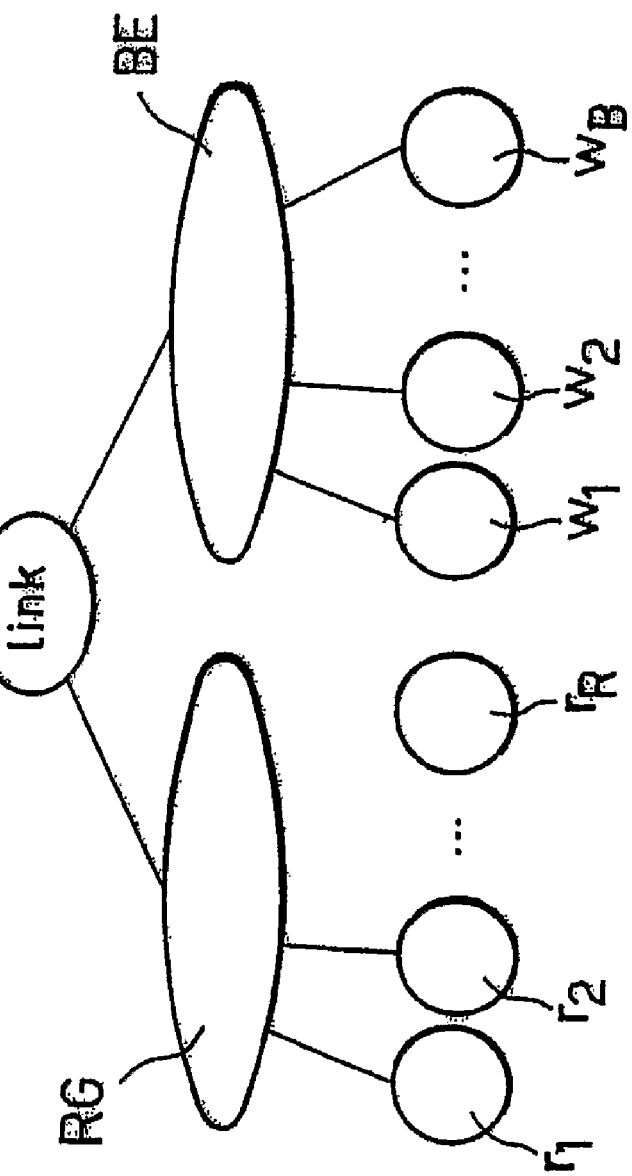

| | | | |
|---|---|---|---|
| 7,336,610 B2 * | 2/2008 | Lenzini et al. | 370/235 |
| 7,349,331 B2 * | 3/2008 | Lenzini et al. | 370/229 |
| 2002/0114334 A1 | 8/2002 | Yang | |
| 2003/0093526 A1 | 5/2003 | Nandagopalan et al. | |
| 2003/0103514 A1 | 6/2003 | Nam et al. | |
| 2005/0172030 A1 * | 8/2005 | Fay | 709/234 |

FOREIGN PATENT DOCUMENTS

| | | |
|---|---|---|
| WO | WO-01/79992 A2 | 10/2001 |
| WO | WO-02/35777 A1 | 5/2002 |
| WO | WO-03/088605 A1 | 10/2003 |

OTHER PUBLICATIONS

A. Francini et al.; "Enhanced Weighted Round Robin Schedulers for Accurate Bandwidth Distribution in Packet Networks", Computers Networks, vol. 37, pp. 561-578, (2001).

M.H. MacGregor et al.; "Deficits for Bursty Latency-critical Flows: DRR++", The Proceedings of the IEEE International Conference on Networks, (ICON '00), Singapore, 7 pages, (2000).

M. Shreedhar et al.; "Efficient Fair Queuing Using Deficit Round-Robin", IEEE/ACM Transations on Networking, vol. 4, No. 3, pp. 375-385, (1996).

I. Stoica et al.; "On the Duality Between Resource Reservation and Proportional Share Resource Allocation", Multimedia Computing and Networking, SPIE Proceedings Series, vol. 3020, pp. 1-8, (1997).

J. Bennett et al. "Hierarchical Packet Fair Queueing Algorithms", IEEE/ACM Transactions on Networking, vol. 5, No. 5, pp. 675-689, (1997).

* cited by examiner

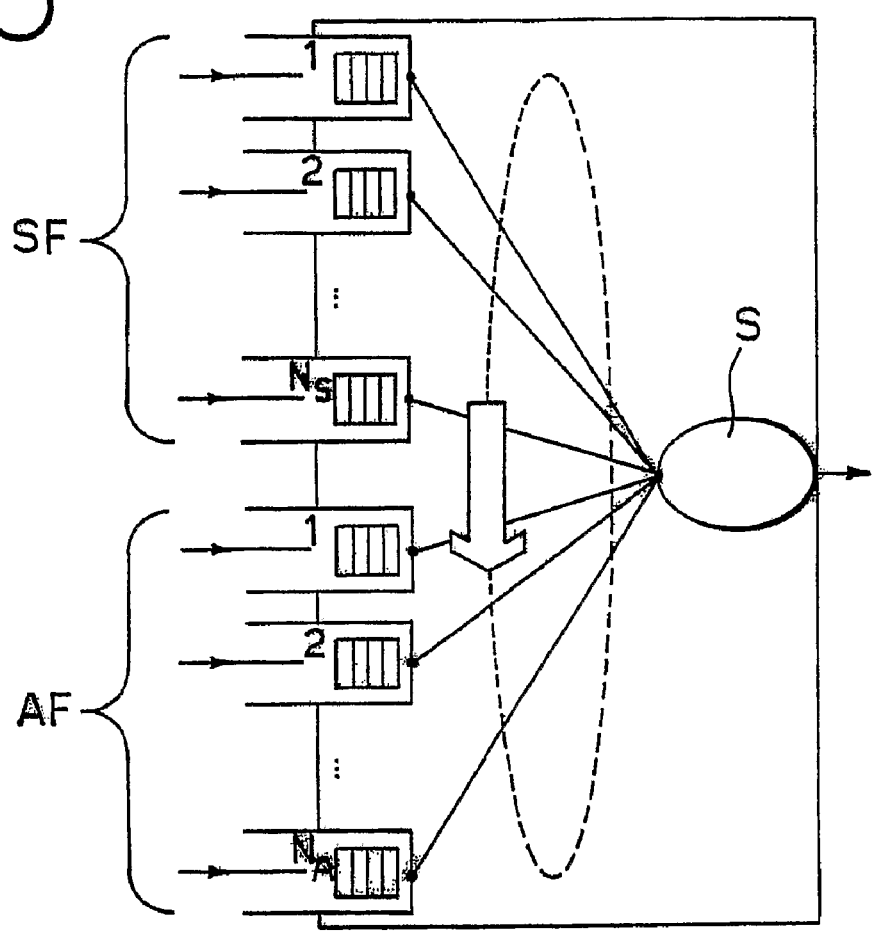

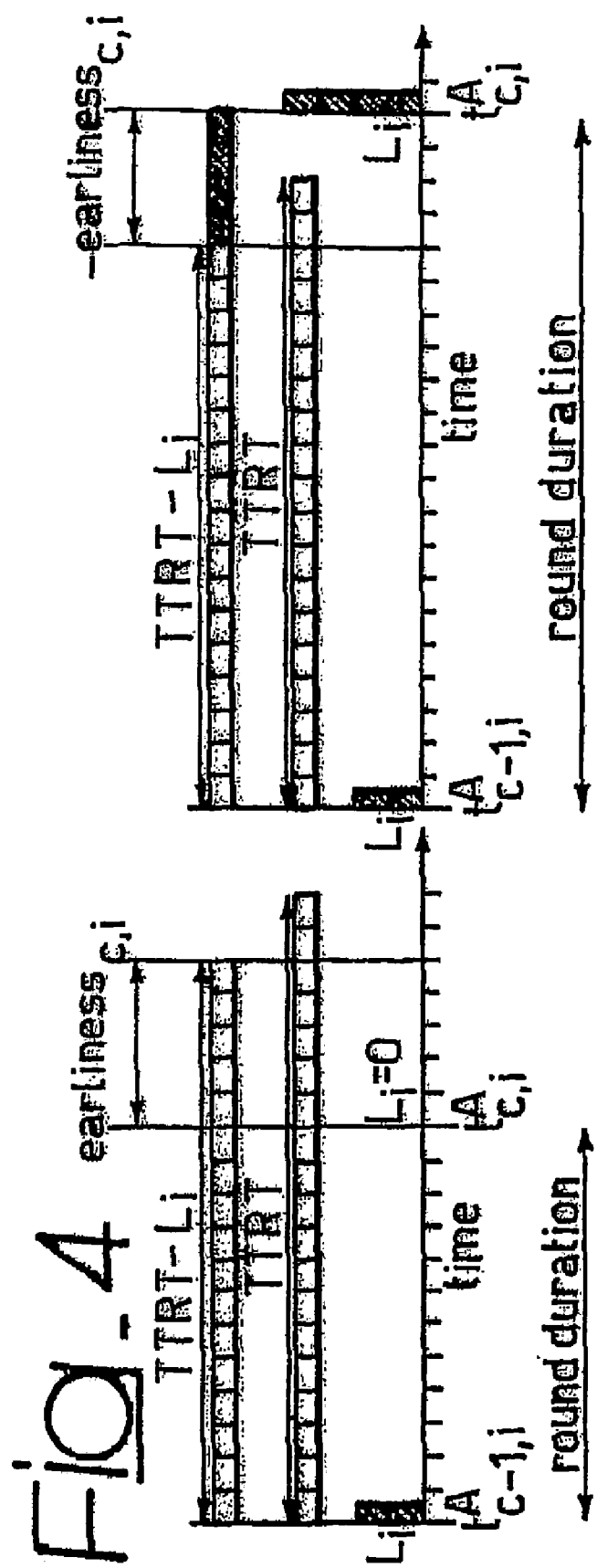

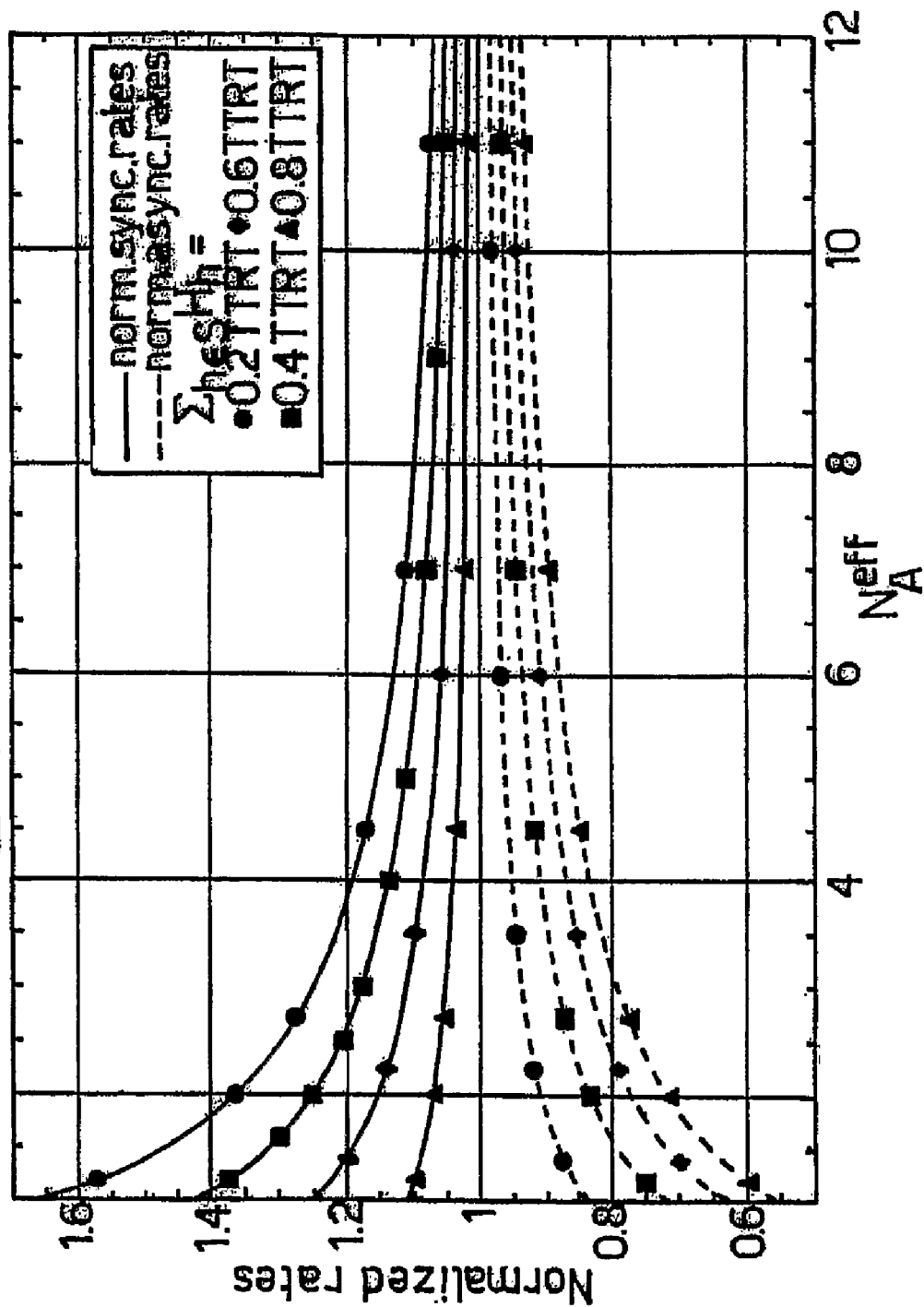

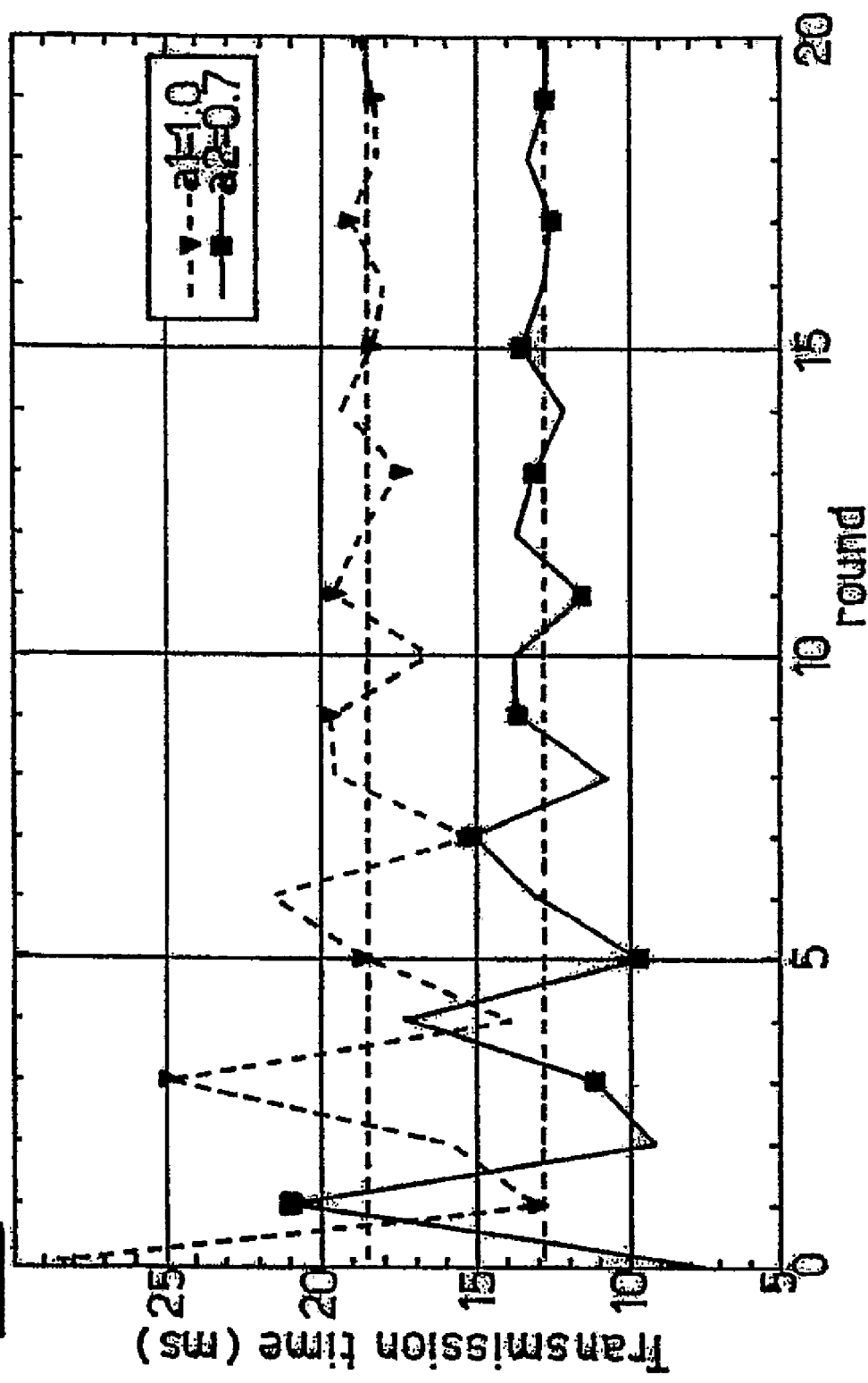

METHOD AND SYSTEM FOR SCHEDULING UTILIZATION OF RESOURCES, RELATED COMMUNICATION NETWORK AND COMPUTER PROGRAM PRODUCT

CROSS REFERENCE TO RELATED APPLICATION

This application is a national phase application based on PCT/EP2004/004379, filed Apr. 26, 2004, the content of which is incorporated herein by reference.

FIELD OF THE INVENTION

The present invention relates to techniques for scheduling utilization of resources such as, e.g. signal processing and/or transmission resources in communication networks.

DESCRIPTION OF THE RELATED ART

The evolution of packet-based network technologies over the last decade, as well as the wide availability of an instance of these technologies, i.e. the Internet, as a global communication infrastructure, are challenging traditional network service models, such as the original TCP/IP's best-effort model. In order to improve Quality of Service (QoS), the need exists for new, alternative service models and traffic management schemes.

The decision of what packet has to be transmitted among many ready to be transmitted on an output link at a node is taken by the service discipline (or scheduling algorithm) managing that output link. Therefore, this component plays a key role in determining the QoS capabilities of a given architecture.

Packet flows may require either a best-effort service, i.e. a service with no specific Quality of Service (QoS) requirement to be complied with, or a rate-guaranteed service, in which the packets are guaranteed a minimum departure rate. Rate-guaranteed traffic and best-effort traffic have very different QoS requirements: rate-guaranteed traffic requires a minimum rate, regardless of the network conditions, while best-effort traffic needs no such guarantee.

From a user standpoint, applications requiring a rate guarantee (e.g. packet telephony) may not improve their performance if they receive more than the required rate, while applications using the best-effort service (e.g. web browsing) may significantly improve their performance as the available capacity increases.

A considerable amount of research effort has been devoted during the last years to scheduling methods. Specifically, much attention has been paid to devising fair queuing service disciplines, i.e. service disciplines approximating the Generalized Processor Sharing (GPS) ideal service paradigm.

The article by L. Lenzini, E. Mingozzi, G. Stea, "A Unifying Service Discipline for Providing Rate-Based Guaranteed and Fair Queuing Services Based on the Timed Token Protocol", IEEE Transactions on Computers Vol. 51 No. 9, pp. 1011-1025, September 2002 as well as WO-A-02/35777 and WO-A-03/088605 define a dual-class switching paradigm (or DC paradigm) in the context of packet switching networks.

In brief, such an approach focuses on the output link of a switching element, whose capacity is C.

Incoming flows are grouped into two sets: the former set includes R rate-guaranteed flows RG, each one requiring a minimum rate $r_i$, $1 \leq i \leq R$, such that $$\sum_{i=1}^{R} r_i \leq C;$$

the latter set includes B best-effort flows BE, each one competing for the available capacity with a weight $w_j$, $1 \leq j \leq B$, according to a weighted fair queuing paradigm.

FIG. 1 shows the two flow sets.

Assuming that $B_R(t)$ and $B_B(t)$ denote the sets of backlogged (i.e. waiting in a queue to be serviced) rate-guaranteed and best-effort flows at time t, respectively, while $R_i(t)$ is the instantaneous service rate of a backlogged flow at time t, the dual-class (DC) paradigm is defined as the one for which, at any time t:

$$R_i(t) = \begin{cases} \dfrac{r_i}{\sum_{j \in B_R(t)} r_j} \cdot C & i \in B_R(t),\ B_B(t) = \emptyset \\ r_i & i \in B_R(t),\ B_B(t) \neq \emptyset \\ \dfrac{w_i}{\sum_{j \in B_B(t)} w_j} \left( C - \sum_{j \in B_R(t)} r_j \right) & i \in B_B(t) \end{cases} \quad (1)$$

In brief, in the DC paradigm, rate-guaranteed flows share fairly the link capacity based on their required rates when no best-effort flow is backlogged. Conversely, when some best-effort flow is backlogged, backlogged rate-guaranteed flows are constrained to use only the configured rate. Any leftover capacity is instead fairly shared among best-effort flows.

This implies that the DC paradigm is work-conserving: it is clear that (1) can only hold in an ideal fluid-flow system, in which multiple flows can be served simultaneously.

The scheduling arrangement described in the prior art documents referred to in the foregoing essentially defines a Timed Token Service Discipline (TTSD), or Packet Timed Token Service Discipline (WO-A-03/088605). This last cited arrangement allows multiple flows to share a resource by:

letting synchronous flows get a minimum required bandwidth;

letting asynchronous flows equally share the leftover bandwidth, i.e. the bandwidth that is not booked or temporarily not used by idle synchronous flows.

The cited article by Lenzini et al. shows that, though devised for the very different context of medium access control in a token ring network, the Timed Token Protocol (TTP) presents some features that make it a good starting point for developing a packet service discipline that approximates the DC paradigm. Specifically, TTP considers two traffic classes, namely synchronous and asynchronous. On each token visit to a node, synchronous traffic can be transmitted for a limited time, while asynchronous traffic transmission time adapts to the token pace in order to keep the inter-token time constant. Synchronous service can be used for transmitting real-time traffic, while TTP offers to each node an identical opportunity to transmit asynchronous traffic. Moreover, asynchronous traffic effectively takes advantage of the capacity not used by synchronous traffic.

Having regard to this, the Timed Token Service Discipline (TTSD) applies the same rules adopted by the TTP to control medium access in order to share the transmission capacity among a set of flows. Specifically, in TTSD rate-guaranteed (or synchronous) flows RG are guaranteed a minimum rate, while all best-effort (or asynchronous) flows BE equally share the majority of the residual capacity. Thus, also TTSD approximates a specific instance of the DC paradigm in which all the best-effort flow weights have the same value.

The article by A. Francini, F. M. Chiussi, R. T. Clancy, K. D. Drucker, and N. E. Idirene, "Enhanced Weighted Round Robin Schedulers For Accurate Bandwidth Distribution in Packet Networks," Computer Networks, Vol. 37, pp. 561-578, November 2001, proposes a round-robin scheduling framework. There, a first-level server first visits all the rate-guaranteed flows, and, after that, passes control onto a sub-server managing the set of best-effort flows. The capacity share given to the sub-server varies from round to round according to the backlog state of the rate-guaranteed flows, so that the capacity not utilized for idle rate-guaranteed flows is in fact used by the sub-server. However, according to this prior art solution, best-effort flows share the available capacity equally.

The article by J. Bennett, H. Zhang, "Hierarchical Packet Fair Queuing Algorithms", IEEE/ACM Transactions on Networking, Vol. 5, No. 5, pp. 675-689, October 1997 describes a Hierarchical GPS (H-GPS) algorithm, which is based on a fluid-flow service discipline.

The bandwidth sharing enforced in the DC paradigm can be compared with the one offered under GPS and H-GPS by considering a simple scenario, in which two rate-guaranteed flows i, j, compete for the available bandwidth with best-effort flow k. Let us first assume that the three flows are scheduled under GPS, according to any selection of weights which is suitable for enforcing the required guarantees to flows i and j when all the three flows are backlogged. When flow i is not backlogged, part of its bandwidth will go to flow j, even if flow k is backlogged, which is undesirable.

Figure 2:
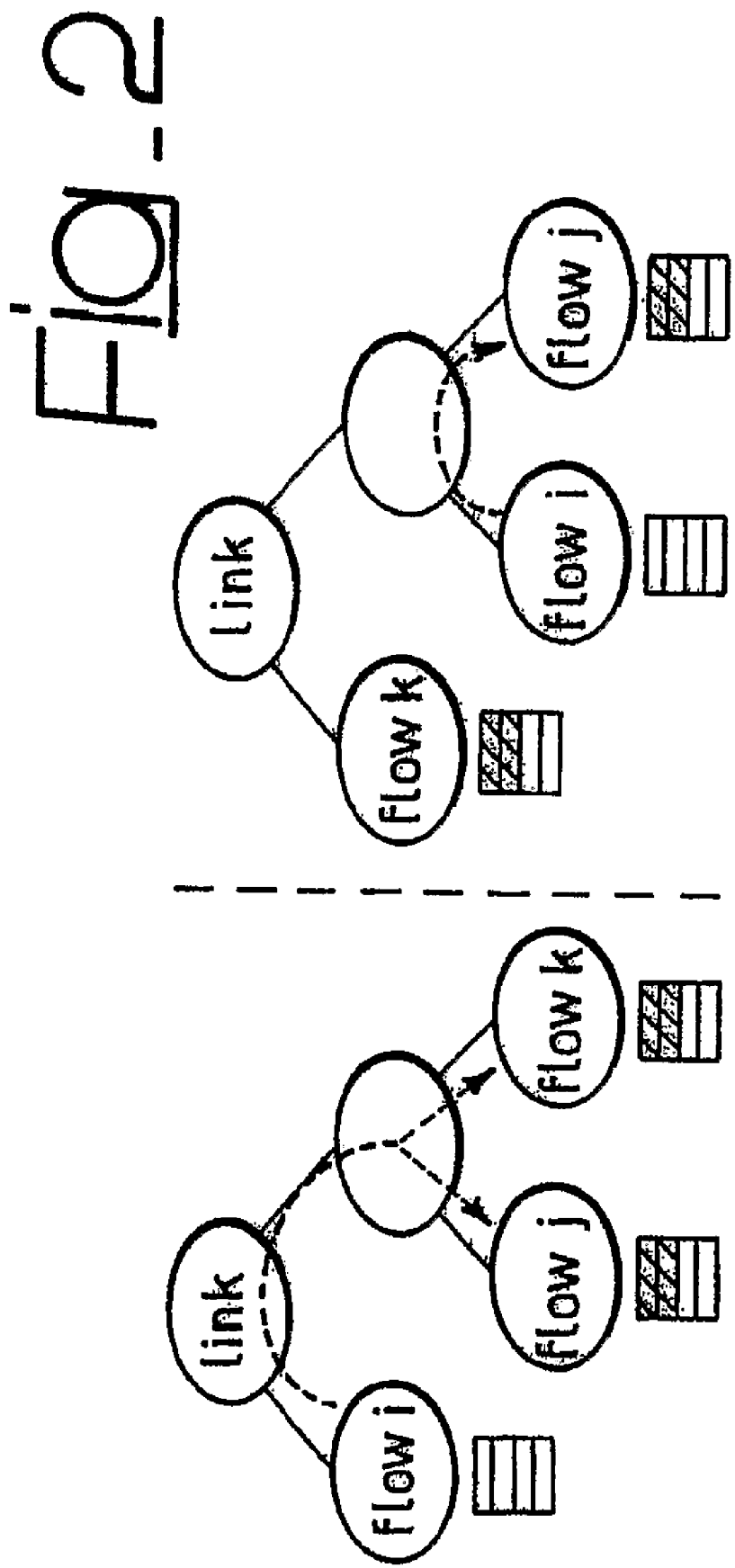

Let us then assume that the same three flows are scheduled under H-GPS, in which case a degree of freedom exists in selecting the tree structure whose leaves are the scheduled flows. Since three flows are considered, three possible cases are given:

a) All three flows are members of the same class. It can be easily shown that the behavior of the H-GPS scheduler in this case is identical to that of a GPS scheduler, which has already been dealt with.

b) Two flows are in a class, and one flow is in another. In that case, two possible sub-cases are given, which are shown in FIG. 2 right and left, respectively. Within the figure, the packet queues for the three flows are shown. Bandwidth redistribution is shown by means of dotted arrows in the figure.

b1) Both rate-guaranteed flows i and j are members of the same class, whereas the best effort flow k is in another class (FIG. 2, right). In that case, when flow i is not backlogged, its bandwidth is made available to the other flow(s) of its class; in this specific scenario, only to flow j.

b2) A rate-guaranteed flow (say, j) and the best effort flow k are members of the same class, while flow i is in another class (FIG. 2, left). In this case, when flow i is not backlogged, its bandwidth is made available to the other class, and thus it is divided between flows j and k.

The Applicant remarks that, in both cases, rate guaranteed flow j obtains more than its required rate when flow i is not backlogged, even if flow k is backlogged, which is undesirable.

A unified framework that schedules two sets of tasks on a processor is proposed in I. Stoica, H. Abdel-Wahab, K. Jeffay, "On the Duality between Resource Reservation and Proportional Share Resource Allocation," Proceedings of Multimedia Computing and Networking 1997, San Jose, Calif., February 1997, SPIE Proceedings Series, Vol. 3020, pp 207-214. While referring to a context different from network scheduling, this prior art document proposes that the DC paradigm should be approximated. Coupling a dynamic weight management policy with a GPS-based service discipline designated EEVDF is suggested to that end. In this context, flows still receive service on a weight basis, but weights are dynamically varied according to the backlog state of the flows.

Applicant remarks that the weight management policy requires the whole set of weights to be re-computed over a packet timescale. Moreover, since a virtual time function is used to sort packets, weight re-computation should also imply packet re-sorting. The same problem also arises when employing other GPS-based service disciplines in a flat or in a hierarchical framework. Therefore, the DC paradigm approximation through a GPS-based service discipline does not seem to be a computationally feasible solution.

U.S. patent application US 2003/0103514 describes a Credit Based Round Robin packet scheduling algorithm. However, Credit Based Round Robin is a scheduling algorithm devised for providing fair queuing. Applicants remark that, as such, the above algorithm does not take into account the problem of sharing the link bandwidth among different traffic classes (namely, rate-guaranteed and best-effort) as specified by the DC paradigm.

Hierarchical Prioritized Round Robin (HPRR) as described in WO-A-01/24428 classifies the flows into a smaller number of traffic classes. Best-effort traffic is classified as belonging to the "default" class. Flow classes are served according to a rate-limited priority scheduling, implemented as a variation of the Deficit Round Robin scheduling. Traffic of non-default classes that exceeds a given profile is treated as best-effort. While such a scheduling method allows some flexibility in devising the service received by each class, it does not allow the default class to use the bandwidth left unused by temporarily idle traffic classes. In fact, when some class is idle, the duration of a round is reduced accordingly, so that each backlogged class receives a fair share of the leftover bandwidth. This is in contrast with the DC paradigm, in which only best-effort flows are granted access to the leftover bandwidth.

Scheduling disciplines which explicitly take into account two traffic classes, namely latency-critical (i.e. real-time) traffic and best-effort traffic have been proposed as extensions of Deficit Round-Robin, namely DRR+ (see, e.g. M. Shreedhar and G. Varghese: "Efficient Fair Queueing Using Deficit Round-Robin", IEEE Transaction on Networking, Vol. 4, No. 3, pp. 375-385, June 1996) and DRR++ (see M. H. MacGregor and W. Shi: "Deficits for Bursty Latency-critical Flows: DRR++", Proceedings of the IEEE International Conference on Networks (ICON '00), Singapore, Sep. 5-8, 2000.

The paper by MacGregor et al. shows that the former cited arrangement is unfit to schedule latency-critical traffic in multi-hop networks, since it demotes it to best-effort as soon as any "burstiness" is accumulated. The second arrangement, namely DRR++, also accounts for bursty latency-critical flows. However, one can easily observe that no formal analysis of DRR++ has been carried out in order to explore what real-time guarantees can be enforced under what conditions.

OBJECT AND SUMMARY OF THE INVENTION

The previous analysis shows that the prior art arrangements suffer from certain essential limitations.

More specifically, when rate-guaranteed flows and best-effort flows are scheduled simultaneously, some of the above mentioned arrangements do not prevent rate-guaranteed flows from obtaining more than the configured minimum bandwidth, thus depriving best-effort flows of a possibly better service level. In case they do, they either do not allow best-effort flows to share the available bandwidth according to selectable weights, or allow such a feature at the price of a scheduling overhead which is unfeasible in high speed environments.

Applicants have found that, in order to efficiently and simultaneously account for rate-guaranteed and best-effort flows, a service discipline can instead approximate an alternative service paradigm, the Dual-Class (DC) paradigm. In the DC paradigm, rate-guaranteed flows are entitled a fixed rate, equal to the requested rate, regardless of the network conditions, and best effort flows share all the residual capacity (i.e. the capacity which has not been reserved for rate-guaranteed flows, or which is temporarily unused by idle rate-guaranteed flows) according to selectable weights. A scheduling discipline based on the DC paradigm would then maximize xthe service provided for best-effort traffic while still meeting the guarantees for rate-guaranteed traffic.

As an example, in a network in which best-effort flows represent aggregate TCP traffic originating from (or directed to) different companies or departments, enforcing a weighted capacity sharing would be extremely desirable.

Moreover, a user should be able to select weights, so that best-effort flows obtain a predictable share of the available bandwidth. For example, in a multi-service network a very low bandwidth share might be allotted to background traffic (such as that originating from machine-to-machine, non interactive applications), while a higher share might be reserved for man-machine interactive applications.

An object of the present invention is thus to dispense with the drawbacks of prior art arrangements while satisfying the needs outlined in the foregoing. According to the present invention, such an object is achieved by means of a method of scheduling utilization of a service resource by a plurality of flows (SF, AF) of information packets, said plurality of flows including rate-guaranteed synchronous flows (SF) and best-effort asynchronous flows (AF), wherein said asynchronous flows (AF) exploit the service capacity of said resource left unexploited by said synchronous flows (SF), the method including the steps of:

providing a server (S) that visits said plurality of flows (SF, AF) in subsequent rounds, said server (S) visiting first within each said round said synchronous flows (SF) followed by said asynchronous flows (AF), detecting any backlogged synchronous flow (h) in said plurality of synchronous flows (SF), when said server (S) visits any said backlogged synchronous flow (h), allowing said backlogged synchronous flow (h) to utilize said resource for a given time, whereby said synchronous flows (SF) have a guaranteed transmission window on each said round, determining a reference round time (TTRT) indicative of the expected time for said server (S) to complete a round of visits of said plurality of flows (SF, AF), when said server (S) visits any said asynchronous flow (AF), determining the time elapsed since the last visit by said server (S) to the same asynchronous flow (AF), and:

i) if the visit to said asynchronous flow (AF) occurs later than expected based on said reference round time (TTRT), restraining said asynchronous flow (AF) being visited from utilizing said resource for the ongoing round, ii) if the visit to said asynchronous flow (AF) occurs earlier than expected based on said reference round time (TTRT), allowing said asynchronous flow (AF) being visited to utilize said resource for a respective given time, said respective given time being a function of the earliness of the server visit, whereby said function regulates the exploitation by each said asynchronous flows (AF) of said service capacity of said resource left unexploited by said synchronous flows (SF).

The invention also relates to a corresponding system, a related communication network and a computer program product loadable in the memory of at least one computer and comprising software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is intended to highlight the possibility for the system of the invention to be implemented in a distributed/modular fashion.

Essentially, a preferred embodiment of the invention is a method of scheduling utilization of a service resource by a plurality of flows of information packets, the plurality of flows including rate-guaranteed synchronous flows and best-effort asynchronous flows, wherein the asynchronous flows exploit the service capacity of said resource left unexploited by the synchronous flows. A server visits the plurality of flows in subsequent rounds, by visiting first within each round the synchronous flows followed by the asynchronous flows.

Hereinbelow the term visit refers to the action/event of conferring the attention of the scheduling system, in a service cycle or round, to a particular user (e.g. a queue, a node or a task) in order to give it the ability to obtain an assigned portion of the resource.

When the server visits any said backlogged synchronous flow, it allows the backlogged synchronous flow to utilize the resource for a given time, whereby the synchronous flows have a guaranteed transmission window on each said round. A reference round time is determined indicative of the expected time for the server to complete a round of visits of the flows. When the server visits any said asynchronous flow, the time elapsed since the last visit by the server to the same asynchronous flow is determined and:

i) if the visit occurs later than expected based on the reference round time, the asynchronous flow being visited is restrained from utilizing the resource for the ongoing round, ii) if the visit occurs earlier than expected based on the reference round time, the asynchronous flow being visited utilizes the resource for a respective given time that is a function of (e.g. proportional to) the earliness of the server visit, whereby the function regulates the exploitation by each asynchronous flow of the service capacity of the resource left unexploited by the synchronous flows.

Preferably, respective functions may be selected regulating the exploitation by the asynchronous flows of the service capacity.

In a particularly preferred embodiment, the respective given time allotted to the asynchronous flows is made proportional to the earliness via a proportionality factor selected, e.g. in the range (0,1] (i.e., excluding 0 but possibly including 1). Respective proportionality factors may thus be selected for the various asynchronous flows.

The arrangement described herein thus implements a Generalized Timed Token Service Discipline (hereinafter GTTSD), namely a general discipline for scheduling a shared resource among multiple clients.

Such an arrangement can be employed, e.g. for scheduling the output link of a router or switch among multiple packet flows in a packet-switching network (such as the Internet). Although described here in that specific context, GTTSD however is applicable to several other contexts, including (but not limited to) scheduling tasks in a processor.

The GTTSD scheduling arrangement described herein approximates the DC paradigm. In fact, it explicitly and simultaneously considers two classes of packet flows: synchronous (i.e. rate-guaranteed) and asynchronous (i.e. best-effort). In addition, it allows a user to specify what shares of the available bandwidth should be given to the different best-effort flows. Synchronous flows are given a minimum guaranteed rate, while the transmission capacity which is not strictly necessary to synchronous flows is shared among the asynchronous ones, according to selectable weights.

The bandwidth sharing properties of a GTTSD arrangement can be used, for example, for:

serving multimedia (e.g. voice) flows, by enforcing a minimum guaranteed rate on each of them;

providing best effort traffic with the maximum possible level of service, thus maximizing their responsiveness.

The GTTSD scheduling arrangement described herein allows a user to select weights (in the form of alpha factors), so that best-effort flows obtain a predictable share of the available bandwidth. In addition, GTTSD reserves, irrespective of the competition, a fixed absolute amount of bandwidth, for an arbitrary number of rate-guaranteed flows.

Moreover, GTTSD approximates the DC paradigm. Any bandwidth not booked or instantly not used by rate-guaranteed flows is thus made available for best-effort flows, which share it according to their alpha factors. Asynchronous flows may thus share the leftover bandwidth according to selectable weights.

BRIEF DESCRIPTION OF THE ANNEXED DRAWINGS

The invention will now be described, by way of example only, by referring to the enclosed figures of drawing, wherein:

FIGS. 1 and 2, generally related to the prior art, have been described previously, FIG. 3 is a block diagram exemplary of the architecture of a system as described herein, FIG. 4 is a chart exemplary of possible operation of a system according to the arrangement described herein, and FIGS. 5 and 6 are diagrams representative of operation data related to the arrangement described herein.

DETAILED DESCRIPTION OF PREFERRED EMBODIMENTS OF THE INVENTION

Although the present detailed description will focus on packet scheduling at a switching node, it is once more recalled that GTTSD can also be used in a variety of contexts, i.e. whenever there is a shared resource that needs to be allocated among multiple requesting entities (e.g. CPU in an operating system).

GTTSD generalizes the TTSD arrangement, which has already been described in the foregoing.

In the following, an input traffic organized in flows, will be considered. The flows are distinguishable streams of traffic to be forwarded on an output link. The mechanisms for classifying traffic into flows does not constitute per se subject matter of this application.

The definition just provided is general enough to match both IntServ's flows, and DiffServ's BAs (Behavior Aggregate—a collection of packets with the same marking of DiffServ related field crossing a link in a particular direction).

GTTSD manages two types of flows, namely synchronous flows and asynchronous flows, which are considered for transmission in a fixed order on a round-robin basis. GTTSD will now be described and analyzed under the assumption that this arrangement manages a set of $N_S$ synchronous flows and a set of $N_A$ asynchronous flows the two sets being denoted SF and AF, respectively. We assume that each flow enqueues its traffic to a separate queue.

FIG. 3 represents the system model under consideration.

Within a round (or revolution), synchronous flows SF are considered first, followed by the asynchronous flows AF. When a server S visits a backlogged synchronous flow h, the latter is allowed to transmit its traffic for a time, which is upper bounded by its synchronous bandwidth $H_h$, which is selected at the time of flow initialization. The server stops visiting the flow h once this time interval has elapsed, or when the flow has cleared its backlog, whichever occurs first. Therefore, synchronous flows SF have a guaranteed transmission window on each round. When the server S visits an asynchronous flow AF, it computes the time elapsed since the last visit to the same flow. If the visit occurs later than expected, then the flow is restrained from transmitting its traffic for the ongoing round. Otherwise, it is allowed to transmit its traffic; in that case, the time interval that the server can spend for transmitting traffic from the flow is proportional to the earliness of the server visit.

Stated otherwise—when the server visits any asynchronous flow, the time elapsed since the last visit by the server to the same asynchronous flow is determined based on the reference (expected) round time and:

i) if the visit occurs later than expected based on the reference round time, the asynchronous flow being visited is restrained from utilizing the resource for the ongoing round, ii) if the visit occurs earlier than expected, the asynchronous flow is allowed to utilize the resource for a time interval proportional to the earliness of the server visit.

The two strategies considered above coincide when the visit occurs exactly when expected. In that case there is no earliness in the server visit and the time the asynchronous flow might (notionally) be allowed to utilize the resource is proportional to an earliness equal to zero and is thus nil. This practically corresponds to restraining the asynchronous flow being visited from utilizing the resource for the ongoing round.

The server stops visiting a flow once the computed time interval has elapsed, or when the flow has cleared its backlog, whichever occurs first. Therefore, asynchronous flows do not have a guaranteed transmission window on a round; instead, their transmission window is adapted to the pace of the server visits, and varies from round to round.

The transmission time to which an asynchronous flow is entitled in a single round is determined as follows.

A reference round duration TTRT (Target Token Revolution Time) has to be selected. A rule for the selection of TTRT will be detailed in the following. Each asynchronous flow i is associated with a variable $L_i$ (lateness), which records the delay accumulated in the previous rounds. The time of the server's $c^{th}$ visit to asynchronous flow i is denoted by $t_{c,i}^A$. When the server visits an asynchronous flow, it subtracts from TTRT the duration of the previous round (i.e. the one which started from the last time that flow was visited), and subtracts $L_i$ from that result, thus computing the flow's earliness for the current round; i.e.:

$$earliness_{c,i} = TTRT - L_i - (t_{c,i}^A - t_{c-1,i}^A) \quad (2)$$

If the earliness is negative (meaning that the server visit occurred in fact later than expected), its absolute value is stored into the $L_i$ variable, and the flow is not allowed to transmit its traffic for the ongoing round, as this might overly delay the subsequent server visits to the synchronous flows. If the earliness is positive, $L_i$ is reset to zero and the flow is granted a time interval for transmission. Such time interval, called the flow's asynchronous bandwidth and denoted as $a_{c,i}$, is computed as follows:

$$a_{c,i} = \alpha_i \cdot earliness_{c,i} \quad (3)$$

where $\alpha_i$ is the flow's alpha factor, included in (0,1], selected at the time of flow initialization. The GTTSD arrangement described herein, generalizes TTSD arrangement in arrangement that the latter is a specific instance of the former in which $\alpha_i = 1$, i=1 ... $N_A$. Thus, in TTSD the asynchronous bandwidth is always equal to the earliness for all the asynchronous flows. A graphic representation of how the earliness is computed in GTTSD is shown in FIG. 4. Both the timing of an early server visit (left) and of a late server visit (right) are shown. The algorithm performed by GTTSD for computing the earliness at the time of a visit to an asynchronous flow is the same as that performed by a TTP node with no synchronous traffic.

As GTTSD is work conserving, the duration of a round may vary. However, after serving the synchronous flows, the algorithm tries to fill most of the expected TTRT time interval transmitting traffic from asynchronous flows (as long as any are backlogged). Therefore, backlogged asynchronous flows are entitled to use most of the capacity which is either not reserved for synchronous flows or temporarily left unused by idle synchronous flows. In GTTSD, the sum of the synchronous bandwidths (which, despite the designation, are expressed as time intervals corresponding to bandwidths) is constrained by the following inequality (protocol constraint):

$$\sum_{h \in S} H_h \leq TTRT \quad (4)$$

An exemplary pseudo-code for the server's visits in GTTSD is shown below. Flow initialization procedures are also reported for completeness.

```
Sync_Flow_Init( )
    h=new_sync_flow_id;
    select_synchronous_bandwidth (H_h);
    add_new_flow_at_the_end (h);
Async_Flow_Init ( )
    i=new_async_flow_id;
    Select_alpha_factor (α_i);
    L_i = 0;
    last_time_i= start_of_curr_round;
    add_new_flow_at_the_end (i);
Sync_Flow_Visit (synchronous flow h)
    B = current_backlog(h);
    Transmit (min (B,H_h));
Async_Flow_Visit (asynchronous flow i)
    t = current_time;
    earliness = TTRT - L_i - (t-last_time_i);
    if ( earliness > 0 )
    { L_i = 0;
        a_i= α_i*earliness;
        B = current_backlog(i);
        Transmit (min (B, a_i)); }
    else L_i = - earliness;
    last_time_i = t;
GTTSD_revolution ( )
    for (h=1 to N_S) Sync_Flow_Visit (h);
    for (i=1 to N_A) Async_Flow_Visit (i);
```

The exemplary pseudo-code reported shows that the number of operations to be performed on each server visit under GTTSD is O(1).

Properties of GTTSD

More specifically, one may prove that the steady state rates for synchronous and asynchronous flows are:

$$R_i = \begin{cases} C \cdot \dfrac{N_A^{\textit{eff}} + 1}{N_A^{\textit{eff}} \cdot TTRT + \sum_{h \in S} H_h} \cdot H_i, & i \in S \\ C \cdot \dfrac{TTRT - \sum_{h \in S} H_h}{N_A^{\textit{eff}} \cdot TTRT + \sum_{h \in S} H_h} \cdot \alpha_i, & i \in A \end{cases} \quad (5)$$

where $N_A^{\textit{eff}}$ denotes the sum of the alpha factors, i.e.

$$N_A^{\textit{eff}} = \sum_{j=1}^{N_A} \alpha_j.$$

Synchronous flow steady state rates are not constant, since they depend on the number of synchronous flows and on the $N_A^{\textit{eff}}$ parameter. However, it is straightforward to see that, as the latter increases, the synchronous rates approach a minimum value $C \cdot H_h / TTRT$.

Therefore, the service offered to asynchronous flows upper bounds the synchronous flow rates. On the other hand, each asynchronous flow receives a weighted fair share of the available capacity, in proportion to its alpha factor. When $N_A^{\textit{eff}}$ is high, (5) can be rewritten as:

$$R_i^* \cong \begin{cases} C \cdot H_i / TTRT, & i \in S \\ C \cdot \dfrac{\alpha_i}{N_A^{\textit{eff}}} \left( 1 - \sum_{h \in S} H_h / TTRT \right), & i \in A \end{cases} \quad (6)$$

Note that, when no asynchronous flow is active (i.e. $N_A^{\textit{eff}} = 0$), (5) yields:

$$R_i = \frac{H_i}{\sum_{h \in S} H_h} \cdot C, \, i \in S$$

Therefore, the steady state capacity sharing embodies the DC paradigm when no asynchronous flow is backlogged and approximates it when asynchronous flows are backlogged. The approximation improves as the asynchronous flows capacity demand increases.

FIG. 5 shows the ratio $R_i/R_i^*$ between the normalized synchronous and asynchronous rates in GTTSD (equation 5 above) and in the ideal case (equation 6 above) against $N_A^{\it eff}$ and for various synchronous loads $$\sum_{h \in S} H_h.$$

The figure shows that a good approximation of the DC paradigm (within 10%) is achieved when $N_A^{\it eff}$ is in the order of ten.

Even though significant, having a tunable steady state bandwidth sharing might not be enough to enforce a controllable behavior on a scheduler. In fact, in a real-life network environment backlog conditions on the flows might change quite rapidly; as a consequence, the scheduler might operate in conditions that are always far from the steady state conditions. Moreover, it could be possible that the transient bandwidth sharing might significantly deviate from the steady state one, thus producing a large unfairness among the asynchronous flows. We then need to gain more insight on how asynchronous flows share their bandwidth during the transient.

During the transitory, each asynchronous bandwidth converges towards its steady state value through dampened oscillations. Thus, an asynchronous flow cannot persistently use more (less) than its steady state bandwidth during the transitory. A simple example shows this.

A 2×2 system is considered with $\alpha_1=1.0\alpha=[1.0,0.7]$, $\alpha_2=0.7$, $$TTRT - \sum_{h \in S} H_h = 50 \text{ ms.}$$

The steady-state asynchronous bandwidths are $a_1 \cong 18.51$ ms, $a_2 \cong 12.96$ ms $a^{(\infty)} \cong [18.51 \text{ ms}, 12.96 \text{ ms}]^T$. FIG. 6 shows the evolution of the 2 asynchronous bandwidths is oscillating around the steady-state value.

Selection of the Alpha Factors

As shown, asynchronous flows AF share their bandwidth according to their alpha factors. However, the higher the alpha factors, the higher their sum $N_A^{\it eff}$, and therefore the closer to 1 the ratios $R_i/R_i^*$ are. Thus, the alpha factors should be normalized so that the largest one is equal to one. In a real-life environment, flows are created and destroyed dynamically.

While, discussing possible interfaces for the setup of an asynchronous flow at a GTTSD scheduler is outside the scope of this application, one may assume that an asynchronous flow i competes for the available bandwidth by specifying a weight $w_i$, as in GPS. In that case, its alpha factor may be selected as:

$$\alpha_i = \frac{w_i}{\max_{j=1,\dots,N_A}(w_j)} \quad (7)$$

Clearly, this ensures that at least one alpha factor is equal to one. On the other hand, this might entail re-computing the value for max when the set of asynchronous flows change (e.g., when the flow with the highest weight is destroyed). This operation can be performed on a software basis at a worst-case implementation cost of $O(\log N_A)$ per flow creation/destruction. However, we observe that such operations take place at a much larger timescale with respect to that of packet transmission, and therefore we expect this computations not to represent a significant overhead.

Scaling upwards the alpha factors increases the bandwidth that an asynchronous flow can exploit on each round. As shown in the next section, this also minimizes the distortion in the bandwidth sharing when finite length packets are transmitted.

Performance Evaluation in the Presence of Packets

The analysis reported in the previous sections is based on the assumption that each flow (either synchronous or asynchronous) can fully exploit the transmission time it is entitled to according to the pseudo-code. In a packet-switching network, traffic is transported in the form of packets, and these need to be transmitted as a whole. Packets make it generally impossible to exactly fill the given transmission time at every server visit, unless one were to consider packet re-segmentation at a node, which does not appear to be a viable solution.

As a consequence the properties outlined in the previous sections might be altered in the presence of packets, especially if their transmission times are comparable to the (synchronous or asynchronous) bandwidths.

Evaluating GTTSD performance in the presence of packets requires the definition of packet management policies, i.e. rules for deciding under what conditions a packet is served when there is not enough leftover transmission time in the current server visit.

After defining suitable packet management policies, operation of a GTTSD scheduler under heavy-load conditions can be considered and the average rates resulting from the experiments compared with those obtained by instantiating (equation 5 above). The way flows share capacity when the system is not heavily loaded can also be determined.

In the rest of the section, we denote with $\tau_i$ the maximum packet transmission time for a flow $i \in S \cup A$, and with $\tau^S$ and $\tau^A$ the maximum packet transmission time over all synchronous and asynchronous flows respectively.

Packet Management Policies

Since different transmission procedures are defined for synchronous and asynchronous traffic, packet management policies can be defined separately for the two traffic types. The problem of packet management with respect to synchronous flows has been already dealt with in the works/documents by Lenzini et al. discussed in the introductory portion of this description.

As far as asynchronous flows are concerned, the following simple and well-known packet management policies could be considered as a starting point:

look-ahead: no packet transmission is allowed to start unless there is enough time to complete it;

overrun: a packet transmission is allowed to start as long as there is some remaining visit time.

Both policies work well when the packet transmission times are negligible with respect to the average asynchronous bandwidth for all asynchronous flows.

Conversely, when the average asynchronous bandwidth is comparable to the maximum packet transmission time for some flows, they may prove inefficient.

Specifically, under the look-ahead policy, flows with smaller alpha factors run the risk of being starved, as there might never be enough asynchronous bandwidth for them to transmit the head-of-line packet.

On the other hand, under the overrun policy, flows with smaller alpha factors tend to be overly favored, thus provoking unfairness among asynchronous flows.

The asynchronous packet management policy may also have a slight impact on the synchronous flows rate guarantees and on the protocol constraint, due to the presence of the $\tau$ parameter. The following asynchronous packet management policy may thus be applied: when there is not enough time for transmitting a packet during the current server visit, the packet is transmitted if the leftover transmission time is greater than or equal to half the packet transmission time.

This policy is simple and minimizes the absolute difference between the asynchronous bandwidth, computed on each round according to the pseudo-code, and the exploited transmission time. This policy proves more efficient than both look-ahead and overrun, in the sense that it avoids starvation and unfairness in a wider range of parameters. Under this asynchronous packet management policy, the worst-case rate guarantees for synchronous flows can be obtained by setting $\tau = \tau^A/2$ in the following relationship $$\overline{R_i} = \frac{N_A + 1}{N_A \cdot TTRT + \sum_{h \in S} H_h + \tau^s + \tau} \cdot H_i \quad (8)$$

where $\tau$ is the maximum overrun due to the transmission of an asynchronous packet, and provided that the following protocol constraint holds:

$$\sum_{h \in S} H_h + \tau^s + \tau \leq TTRT \quad (9)$$

Expression (8) holds regardless of the selection of the alpha factors on the asynchronous flows.

As an application of normal design procedures, a person skilled in the art would, based on general principles disclosed in the present description, easily determine further packet management rules for asynchronous flows, e.g. choosing from deterministic vs. probabilistic, stateful vs. stateless, etc.

Performance Evaluation in Heavy-Load Conditions

In order to gain insight into the limits of the applicability of (equation 5 above) in the presence of packets a GTTSD scheduler operation under heavy-load conditions can be simulated and the experimental results compared with those obtained analytically.

For instance, a GTTSD scheduler can be simulated in the following context: an IP switching node with a 10 Mbps output link shared by 1 synchronous and 6 asynchronous flows, all of which are kept always backlogged. We select the following alpha factors for the six asynchronous flows: $\alpha_{1,2} = 0.25$, $\alpha_{3,4} = 0.5$, $\alpha_{5,6} = 1.0$. The synchronous flow's bandwidth is selected as a constant fraction $\gamma$ of TTRT, i.e. $H_1 = \gamma \cdot TTRT$, and the maximum packet length on all flows is 1500 bytes, so that $\tau^S = \tau^A = 1.2$ ms. Packet lengths are taken from an empirical distribution, reported in Table 1, which is representative of what is actually measured at an Internet router.

Experimental results show that the lengths of packets which traverse the Internet are not evenly distributed. Some packet lengths (specifically 28, 40, 44, 48, 52, 552, 576, 628, 1420 and 1500 bytes) have a relatively large probability associated with them. Packet lengths other than those listed above can be broadly divided into three ranges: 40 to 80 bytes, 80 to 576, 576, to 1500. A true Internet-like packet length distribution be obtained by assuming that packet lengths are uniformly distributed within those ranges, with an overall range probability equal to 1.6%, 9.6%, 17.7%. This situation is summarized in table 1.

TABLE 1

| empirical packet length distribution | |
|---|---|
| Packet Length | Percentage |
| 28 | 0.08% |
| 40 | 3.51% |
| 44 | 0.22% |
| 48 | 0.24% |
| 52 | 0.45% |
| 552 | 1.10% |
| 576 | 16.40% |
| 628 | 1.50% |
| 1420 | 10.50% |
| 1500 | 37.10% |
| range from 40 to 80 | 1.60% |
| range from 80 to 576 | 9.60% |
| range from 576 to 1500 | 17.70% |

We vary the synchronous load from $\gamma = 0.1$ to $\gamma = 0.8$, and a scenario with various values of TTRT is considered. Additionally, packet length is assumed to be uniformly distributed in this and in the following intervals.

In order to get an insight into how TTRT influences the capacity sharing in the presence of packets, the average of the rate samples is considered (rate samples are collected by averaging the number of bytes received over time intervals of 500 ms) for each flow $r_i^S$, $r_i^A$, $1 \leq i \leq 6$, as TTRT varies from 3 to 20 ms and when $\gamma = 0.3$. The steady state rates obtained by instantiating (equation 5 above) are also considered. As expected, as TTRT increases, the simulation results overlap the steady state rates computed by means of equation 5. As TTRT diminishes, unfairness progressively arises among asynchronous flows; specifically, flows with smaller alpha factors fail in obtaining the desired rate, which instead is mostly shared among the asynchronous flows with higher alpha factors and also partially redirected to the synchronous flow.

Assuming that the alpha factors and the maximum packet lengths are input data, the asynchronous bandwidths depend on both TTRT (directly) and $\gamma$ (inversely).

A quick rule-of-thumb leads to selecting TTRT in such a way that the rate that each flow actually receives does not differ significantly from that computed by applying equation 5. Specifically, let m be the asynchronous flow with the minimum alpha factor and $\overline{\tau_m}$ the transmission time of the average length packet. Then, TTRT should be no smaller than $$TTRT^* = \frac{1}{1-\gamma} \cdot \left( \frac{\overline{\tau_m}}{2} \cdot \frac{1 + \sum_{j=1}^{N_A} \alpha_j}{\alpha_m} + \tau^s \right) \quad (10)$$

i.e., the value obtained by equating the steady-state asynchronous bandwidth for flow m to half its average packet transmission time. The packet arrangement policy applied to the asynchronous flows allows that a packet be transmitted as long as remaining transmission time is greater than or equal to half the packet length.

In general, the selection of TTRT can be performed by taking into account the following considerations: TTRT is the expected round duration. Therefore, the lower it is, the more responsive the scheduling is. It is expectable that a lower value for TTRT yields lower delay bounds for the rate guaranteed flows. On the other hand, when TTRT becomes comparable with the average and maximum packet transmission times, unfairness may arise on the asynchronous flows, due to the fact that asynchronous bandwidths might occasionally be not large enough to transmit a single packet. As a quick rule-of-thumb, a lower bound on TTRT, that should avoid unfairness, can be computed and adopted.

Performance Evaluation with Dynamically Changing Loads

Sharing capacity by GTTSD when all flows are constantly backlogged has been previously investigated. Additionally, the relative rate ratio among couples of backlogged asynchronous flows may be shown to remain constant as the backlog state of other flows varies. In order to do so, a node is simulated with the same set of flows described previously; the same alpha factors (i.e. $\alpha_{1,2}=0.25$, $\alpha_{3,4}=0.5$, $\alpha_{5,6}=1.0$) are used, and TTRT=20 ms and $\gamma$=0.3.

Two sets of experiments are performed by varying the offered load i) on the synchronous flow and ii) on asynchronous flow number 5, while the others are kept always backlogged.

In the first set of experiments, the load offered in the synchronous flow is varied from 0.1 to 1.2 of its steady state rate under heavy-load conditions, which is from 0.35 to 4.6 Mbps.

The experiments show that, regardless of the variation in the offered load on the synchronous flow, the rate ratios $r_i^A/r_6^A$ $1 \leq i \leq 6$ remain constant and equal to the respective alpha factor ratios $\alpha_i/\alpha_6$.

In the second set of experiments, the load offered on asynchronous flow 5 has varied from 0.1 to 1.2 of its steady state rate under heavy-load conditions, which is from 0.2 to 2.3 Mbps. The backlogged asynchronous flows shared most of the capacity which is not used by an underloaded asynchronous flow, whereas only a much smaller fraction was exploited by the synchronous flow (whose rate actually varies from 3.5 to 3.7 Mbps, i.e. less than 6%). Regardless of the variation in the load offered on the underloaded asynchronous flow, the rate ratios $r_1^A/r_6^A$ remain constant for the other flow and equal to the respective alpha factor ratios $\alpha_i/\alpha_6$. The experiments were repeated by varying other parameters, such as the packet length distribution on the asynchronous flows uniform on all flows, bimodal on all flows, mixed and the TTRT value.

The results obtained were in agreement with those described previously. Backlogged asynchronous flows thus share bandwidth according to their alpha factors, irrespective of the dynamic variations in the backlog state of other (synchronous and asynchronous) flows.

This applies also to possible alternative embodiments exploiting different packetization policies of asynchronous flows and/or the possible implementation of GTTSD on a network processor.

Therefore, without prejudice to the underlying principles of the invention, the details and the embodiments may vary, also significantly, with respect to what has been described by way of example, without departing from the scope of the invention as defined in the claims that follow.

The invention claimed is:

1. A method of scheduling utilization of a service resource by a plurality of flows of information packets, said plurality of flows comprising rate-guaranteed synchronous flows and best-efforts asynchronous flows, wherein said asynchronous flows exploit the service capacity of said resource left unexploited by said synchronous flows, comprising the steps of:
   providing a server that visits said plurality of flows in subsequent rounds, said server visiting first within each said round said synchronous flows followed by said asynchronous flows;
   detecting any backlogged synchronous flow in said plurality of synchronous flows;
   when said server visits any said backlogged synchronous flow, allowing said backlogged synchronous flow to utilize said resource for a given time, whereby said synchronous flows have a guaranteed transmission window on each said round;
   determining a reference round time indicative of the expected time for said server to complete a round of visits of said plurality of flows;
   when said server visits any said asynchronous flow, determining the time elapsed since the last visit by said server to the same asynchronous flow; and:
      i) if the visit to said asynchronous flow occurs later than expected based on said reference round time, restraining said asynchronous flow being visited from utilizing said resource for the ongoing round,
      ii) if the visit to said asynchronous flow occurs earlier than expected based on said reference round time, allowing said asynchronous flow being visited to utilize said resource for a respective given time, said respective given time being a function of an earliness value representing an amount of time the server visit is earlier than expected, whereby said function regulates the exploitation by each said asynchronous flows of said service capacity of said resource left unexploited by said synchronous flows,
   wherein said respective given time is proportional to said earliness value via a proportionality factor, and
   wherein said proportionality factor is a ratio of a weight assigned to said asynchronous flow to a maximum weight among a plurality of weights assigned to said asynchronous flows.

2. The method of claim 1, wherein said server stops visiting any said flows,
   when said given time or respective given time has elapsed, or
   when the flow being visited has cleared its backlog, whichever occurs first.

3. The method of claim 1, comprising the steps of:
   determining a synchronous bandwidth for said synchronous flows; and
   setting an upper bound to said given time as a function of said synchronous bandwidth.

4. The method of claim 1, comprising the steps of:
   associating with each said asynchronous flow a value indicative of delay accumulated by said server in visiting said asynchronous flow in previous rounds;
   when said server visits said asynchronous flow, subtracting from said reference round time a duration of a previous round to obtain a subtraction result; and
   subtracting said value from said subtraction result thus computing said earliness value for a current round.

5. The method of claim 4, comprising the steps of:
   if said earliness value is negative, storing an absolute value thereof in said value indicative of delay accumulated; and
   restraining said asynchronous flow being visited from utilizing said resource for said current round.

6. The method of claim 4, comprising the steps of:
   if said earliness value is positive, resetting to zero said value indicative of delay accumulated; and
   granting said asynchronous flow being visited said respective given time for utilizing said resource.

7. The method of claim 1, comprising the step of selecting said proportionality factor in a range (0,1].

8. The method of claim 1, comprising the step of selecting respective proportionality factors for said asynchronous flows.

9. The method of claim 1, comprising the step of determining respective synchronous bandwidths for said synchronous flows, wherein a sum of time intervals corresponding to said synchronous bandwidths is lower than or equal to said reference round time.

10. A system for scheduling utilization of a service resource by a plurality of flows of information packets, said plurality of flows comprising rate-guaranteed synchronous flows and best-effort asynchronous flows, wherein said asynchronous flows exploit the service capacity of said resource left unexploited by said synchronous flows, the system comprising a server configured for visiting said plurality of flows in subsequent rounds, said server visiting first within each said round said synchronous flows followed by said asynchronous flows, said server being configured for:
detecting any backlogged synchronous flow in said plurality of synchronous flows, when said server visits any said backlogged synchronous flow, allowing said backlogged synchronous flow to utilize said resource for a given time, whereby said synchronous flows have a guaranteed transmission window on each said round;
determining a reference round time indicative of the expected time for said server to complete a round of visits of said plurality of flows,
when said server visits any said asynchronous flow, determining the time elapsed since the last visit by said server to the same asynchronous flow, and:
i) if the visit to said asynchronous flow occurs later than expected based on said reference round time, restraining said asynchronous flow being visited from utilizing said resource for the ongoing round,
ii) if the visit to said asynchronous flow occurs earlier than expected based on said reference round time, allowing said asynchronous flow being visited to utilize said resource for a respective given time, said respective given time being a function of an earliness value representing an amount of time the server visit is earlier than expected, whereby said function regulates the exploitation by each said asynchronous flows of said service capacity of said resource left unexploited by said synchronous flows,
wherein said respective given time is proportional to said earliness value via a proportionality factor, and
wherein said proportionality factor is a ratio of a weight assigned to said asynchronous flow to a maximum weight among a plurality of weights assigned to said asynchronous flows.

11. The system of claim 10, wherein said server is configured for stopping visiting any said flows:
when said given time or respective given time has elapsed, or
when the flow being visited has cleared its backlog, whichever occurs first.

12. The system of claim 10, wherein said sever is configured for:
determining a synchronous bandwidth for said synchronous flows; and
setting an upper bound to said given time as a function of said synchronous bandwidth.

13. The system of claim 10, wherein said server is configured for:
associating with each said asynchronous flow a value indicative of delay accumulated by said server in visiting said asynchronous flow in previous rounds,
when said server visits said asynchronous flow, subtracting from said reference round time a duration of a previous round to obtain a subtraction result, and
subtracting said value from said subtraction result, thus computing said earliness value for a current round.

14. The system of claim 13, wherein said server is configured for:
if said earliness value is negative, storing an absolute value thereof in said value indicative of delay accumulated; and
restraining said asynchronous flow being visited from utilizing said resource for said current round.

15. The system of claim 13, wherein said server is configured for:
if said earliness value is positive, resetting to zero said value indicative of delay accumulated; and
granting said asynchronous flow being visited said respective given time for utilizing said resource.

16. The system of claim 10, wherein said server is configured for using as said proportionality factors in a range (0,1].

17. The system of claim 10, wherein said server is configured for using respective proportionality factors for said asynchronous flows.

18. The system of claim 10, wherein said server is configured for determining respective synchronous bandwidths for said synchronous flows, wherein a sum of time intervals corresponding to said synchronous bandwidths is lower than or equal to said reference round time.

19. A communication network comprising the system of claim 10.

20. A non-transitory computer readable medium encoded with a computer program product loadable into a memory of at least one computer and comprising software code portions for performing the method of claim 1.

* * * * *